(12) United States Patent
Lin et al.

(10) Patent No.: US 10,931,806 B2
(45) Date of Patent: Feb. 23, 2021

(54) REMOTELY MANAGING AND CONTROLLING SYSTEM AND METHOD

(71) Applicants: INWELLCOM TECHNOLOGY CO., LTD., Taipei (TW); Jian-Jr Lin, Taipei (TW)

(72) Inventors: Jian-Jr Lin, Taipei (TW); Ke-Sen Huang, Taipei (TW)

(73) Assignees: Inwellcom Technology Co., Ltd., Taipei (TW); Jian-Jr Lin, Taipei (TW)

( * ) Notice: Subject to any disclaimer, the term of this patent is extended or adjusted under 35 U.S.C. 154(b) by 599 days.

(21) Appl. No.: 15/867,866

(22) Filed: Jan. 11, 2018

(65) Prior Publication Data

US 2018/0139321 A1    May 17, 2018

Related U.S. Application Data

(63) Continuation-in-part of application No. 14/564,407, filed on Dec. 9, 2014, now abandoned.

(51) Int. Cl.
| | |
|---|---|
| *H04M 1/725* | (2021.01) |
| *H04M 1/72415* | (2021.01) |
| *H04Q 9/02* | (2006.01) |
| *G08C 17/02* | (2006.01) |

(52) U.S. Cl.
CPC ........ *H04M 1/72415* (2021.01); *G08C 17/02* (2013.01); *H04Q 9/02* (2013.01); *G08C 2201/93* (2013.01); *H04Q 2209/43* (2013.01)

(58) Field of Classification Search
CPC .............. H04M 1/72533; G08C 17/02; G08C 2201/93; H04Q 9/02; H04Q 2209/43
See application file for complete search history.

(56) References Cited

U.S. PATENT DOCUMENTS

| | | | | |
|---|---|---|---|---|
| 8,307,413 | B2* | 11/2012 | Smadja | H04L 63/0853 726/9 |
| 9,084,106 | B1* | 7/2015 | Alberts | H04L 67/40 |
| 2007/0075956 | A1* | 4/2007 | Satou | G09G 3/3614 345/98 |
| 2009/0260064 | A1* | 10/2009 | McDowell | G06Q 30/06 726/4 |

(Continued)

*Primary Examiner* — Oanh Duong
(74) *Attorney, Agent, or Firm* — Bradley J. Thorson; DeWitt LLP

(57) ABSTRACT

A remotely managing and controlling system and a remotely managing and controlling method are provided to a user for receiving feedback information and control right of the target device through a remote connecting device. To achieve the above goal, a remote control program is proposed and installed in a controlling device, named controlling terminal, and the target device, to determine whether operation modes can be executed through the remote connecting device. The remote connecting device transmits control commands and data to the target device, and receives the feedback information and the control right of the target device. Then, the controlling terminal can control the target device according to the feedback information for increasing the efficiency of data management. Further, the system and the method can receive a location of the target device through a tracing platform, and control the target device for increasing security of data stored in the target device.

40 Claims, 12 Drawing Sheets

(56) References Cited

U.S. PATENT DOCUMENTS

| | | | |
|---|---|---|---|
| 2012/0146918 A1* | 6/2012 | Kreiner | G06F 3/0481 345/173 |
| 2012/0200571 A1* | 8/2012 | Newell | G06F 3/14 345/428 |
| 2012/0287022 A1* | 11/2012 | Queen | G09G 5/006 345/2.1 |
| 2013/0151642 A1* | 6/2013 | Killmer | H04L 12/5805 709/206 |
| 2014/0068469 A1* | 3/2014 | Lee | H04M 1/7253 715/761 |
| 2014/0125590 A1* | 5/2014 | Flagg | A63F 13/2145 345/157 |
| 2014/0125631 A1* | 5/2014 | Lin | G06F 3/0488 345/175 |
| 2014/0191982 A1* | 7/2014 | Guo | G06F 1/3203 345/173 |
| 2014/0359477 A1* | 12/2014 | Chen | H04N 21/4222 715/748 |
| 2015/0195474 A1* | 7/2015 | Lu | H04N 21/43615 348/552 |
| 2020/0264741 A1* | 8/2020 | Kreiner | G06F 3/0482 |

\* cited by examiner

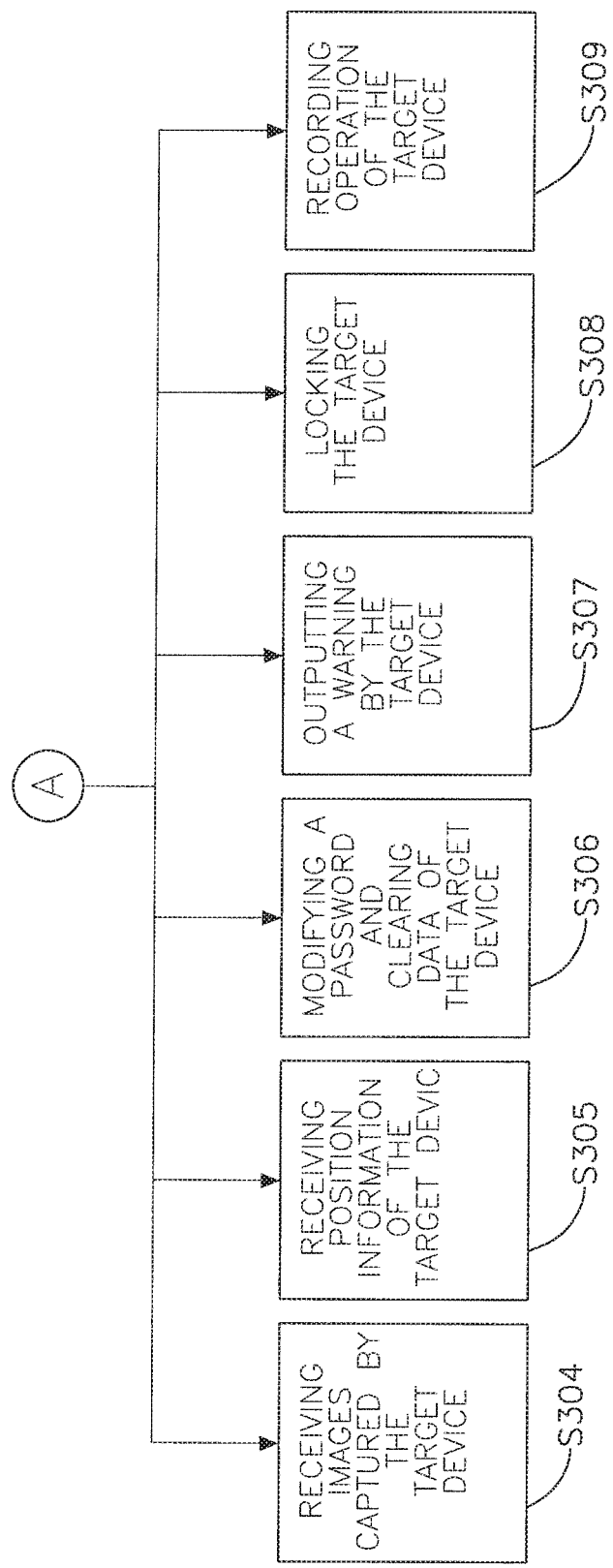

REMOTELY MANAGING AND CONTROLLING SYSTEM AND METHOD

CROSS-REFERENCE TO RELATED APPLICATIONS

This application is a continuation-in-part (CIP) application of U.S. application Ser. No. 14/564,407, filed on Dec. 9, 2014, the disclosures of which are incorporated herein in their entirety by reference.

BACKGROUND OF THE INVENTION

1. Field of the Invention

The present invention relates to a managing and controlling system, and especially relates to a remotely managing and controlling system through a point to point transmission, and the system can further trace and control the target device through the Internet.

2. Description of the Related Art

Mobile devices are developed vigorously in recent years. Users can obtain so much information they want from the Internet by the mobile device. The user can further store, share, modify, or integrate the information on the mobile device. The mobile device can provide the user with a plurality of managing functions. A common mobile device has much software for managing the information, such as a phone book, a calendar, a notebook of the mobile device, and the user can edit, store, or delete the information stored in the mobile device.

Traditionally, mobile phones can be synchronized with each other according to a synchronizing system. The user can use the synchronizing system to share and manage data between different mobile phones and different digital systems. The synchronizing system comprises a digital device, such as a mobile phone or a computer, a server, and a database stored in a storage device. The digital device can wirelessly connect with the server according to a communication protocol, and then can manage data stored in the server. The storage device having the database can connect to the server through the Internet, and the digital device can access data stored in the storage device.

The synchronizing system further executes a data synchronizing and sharing method, and the data synchronizing and sharing method comprises the following steps:

connecting the digital device to server through the Internet by a communication protocol of wireless application protocol (WAP);

managing data stored in the digital device; and connecting to the storage device through the server for accessing the data stored in the storage device.

The data synchronizing and sharing method can synchronize and share data between different digital devices. Then the user can manage the data stored in the mobile phone by another digital device, such as a computer. However, when the data are synchronized or shared, the digital device is connected to the server through the Internet, and the data are transmitted to and stored in the storage device through the server. Therefore, a transmission speed is limited by communication quality of the Internet or strength of the wireless signals. When the digital device cannot be connected to the Internet, the data cannot be synchronized and shared. Then, the user only can edit or modify the data on a small screen of the mobile phone, and it is very inconvenient for the user.

SUMMARY OF THE INVENTION

An objective of the present invention is to provide a remotely managing and controlling system and a remotely managing and controlling method. The system can transmit data between different devices via a direct connection, and the method is more efficient for managing data stored in a target device.

To achieve the foregoing objective, the system comprises a controlling terminal and at least one remote connecting device.

The controlling terminal comprises a first processor, at least one control interface, an input port, and an output port. The first processor is electronically connected with the at least one control interface, the input port, and the output port, and executes a remote control program.

The remote connecting device comprises a controller, a transmission interface, a communication module, and a storage unit. The controller is electronically connected with the transmission interface, the communication module, and the storage unit, and can identify user identification. The communication module communicates with a target device for receiving and transmitting the data. The transmission interface is electronically connected with the input port and the output port of the controlling terminal to transmit data.

The target device has an installed remote control program and is managed and controlled by the controlling terminal.

The controlling terminal receives data from the target device, and displays the data on a monitor through the control interface. The controlling terminal further provides the user to input a control command by the control interface. The control command is transmitted to the target device through the remote connecting device. Then, the controlling terminal can control the target device. The controlling terminal and the target device are connected by a wired or wireless point to point transmission through the remote connecting device to increase the efficiency and convenience of the data management.

To achieve the foregoing objective, a remotely managing and controlling method is performed by a remote managing and controlling system that includes a controlling device, at least one remote connecting device and at least one target device with the at least one remote connecting device electronically connected to the controlling device and communicatively connected to the respective target device. The method comprises determining whether a controlling device and a remote connecting device are successfully connected;

determining whether an identity of the controlling device is correctly authenticated when determining that the controlling device and the remote connecting device are successfully connected;

determining whether an installation mode or a portable mode is selected;

installing a remote control program stored in the remote connecting device in the controlling device when the installation mode is selected;

executing the remote control program;

transmitting displayed data from the target device to the controlling device, and transmitting a control command from the controlling device to the target device; and executing an operation ode by the target device according to the control command.

The remote connecting device and the controlling device are electronically connected with each other, and the controlling device can connect to the target device according to point to point transmission by executing the method. When the remote control program is executed, a user can execute functions about remote control according to the remote control program, such as remotely operating the target device, transmitting data between the controlling device and the target device, backing up or restoring data of the target device, and tracing a lost target device.

Further, the controlling device transmits data from the target device and through the remote connecting device to the control interface for displaying. The user can input a control command of an operation mode, and the control command is transmitted to the target device through the remote connecting device. Then, the target device can edit, control, and manage data stored in the target device according to the control command transmitted from the controlling device. Therefore, even if the data cannot be transmitted through the Internet, the user can use the control interface of the controlling device to edit, store, back up, or exchange data stored in the target device. The user further can execute programs and functions of the target device through the point to point transmission between the remote connecting device and the target device, and efficiency of remote data control can be increased.

A position of the target device can be obtained according to data exchange according to a connection between the target device and a third party platform through the Internet. The control command can be transmitted to the target device to increase efficiency for protecting the data. The data may be a file, an operation system, program software, a message, a communication record, a communication book, an email, or a setting value of a device.

Other objectives, advantages and novel features of the invention will become more apparent from the following detailed description when taken in conjunction with the accompanying drawings.

BRIEF DESCRIPTION OF THE DRAWINGS

FIG. 9A and FIG. 9B are flow charts of tracing a target device;

DETAILED DESCRIPTION OF THE INVENTION

Figure 1:
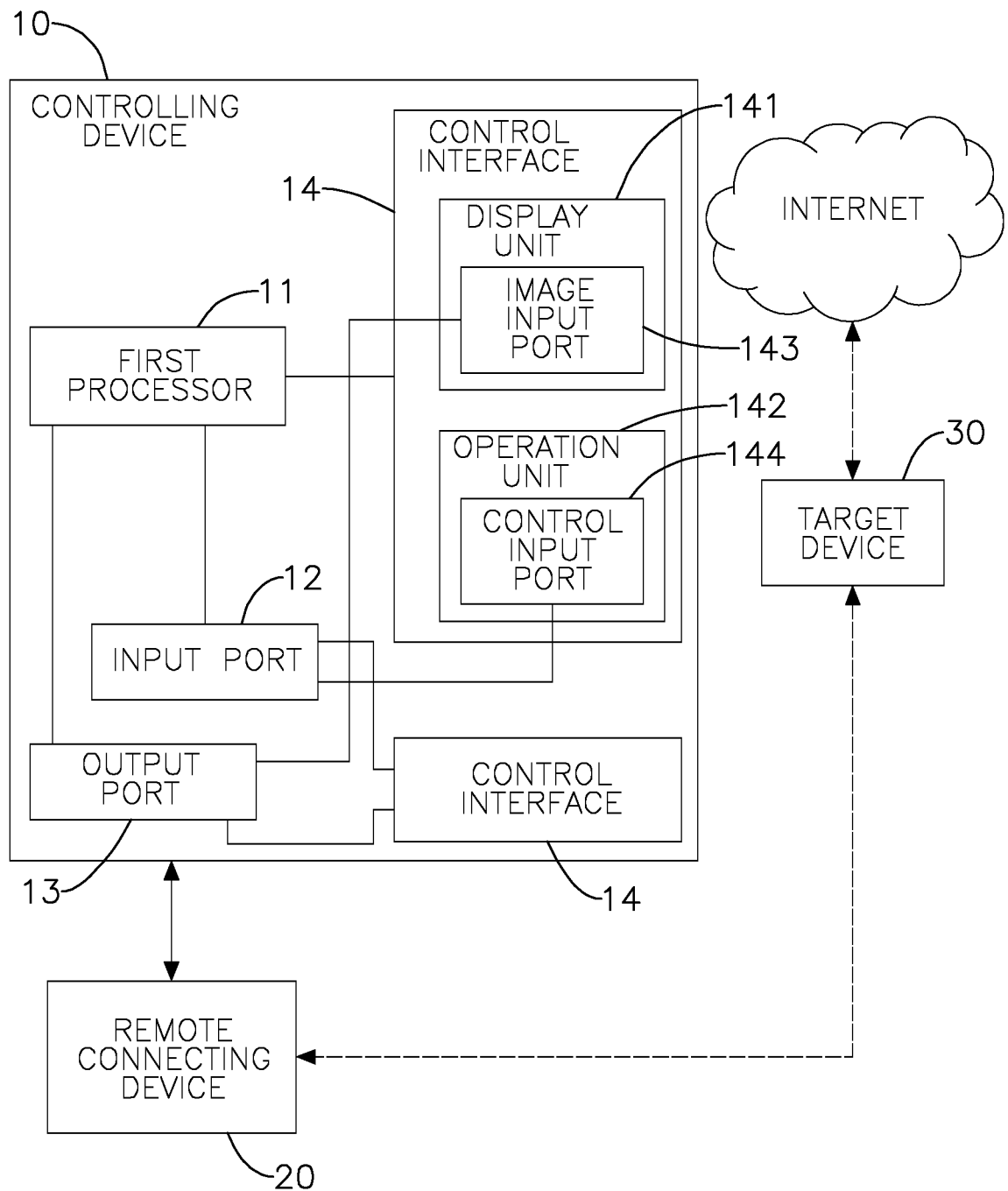
FIG. 1 is a block diagram of a first embodiment of a remotely managing and controlling system in accordance with the present invention.
Figure 2:
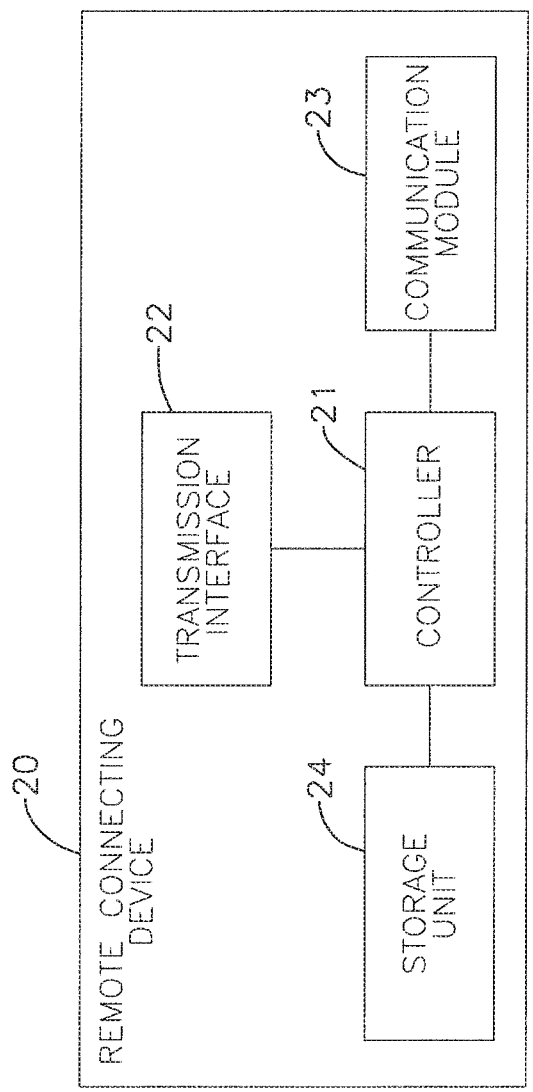
FIG. 2 is a block diagram of a remote connecting device of the system in FIG. 1.

The present invention provides a remotely managing and controlling system and a remotely managing and controlling method. With reference to FIGS. 1 and 2, a first embodiment of the system provides a controlling terminal, a remote connecting device 20, and a target device 30. The controlling terminal is a controlling device 10 for receiving feedback information of the target device 30, and control right of the target device 30 is transmitted through a remote connecting device 20 to the controlling device 10. A remote control program is installed in the remote connecting device 20 and the target device 30. The remote control program provides a user with functions of controlling and managing the target device 30. In the embodiment, the target device 30 is a mobile device, such as a mobile phone. The remote connecting device 20 is connected with the target device 30 through a wired or wireless connection.

The controlling device 10 comprises a first processor 11, an input port 12, an output port 13, and at least one control interface 14. The input port 12 and the output port 13 are electronically connected with the at least one control interface 14. The first processor 11 is electronically connected with the at least one control interface 14, the input port 12, and the output port 13. The controlling device 10 may be a personal computer or a notebook computer, and the target device 30 may be a smart phone or a tablet.

In the present embodiment, the controlling device 10 includes two control interfaces 14. Each control interface 14 has a display unit 141 and an operation unit 142. The display unit 141 has an image input port 143 electronically connected with the output port 13 of the controlling device 10. When the controlling device 10 receives the feedback information from the target device 30, the controlling device 10 transmits an image signal of the feedback information to the display unit 141 for display. Thus, the user can watch pictures corresponding to the image signal on a larger monitor. The pictures are images shown in the target device 30 with a small monitor. The display unit 141 may be a monitor of a computer or a digital display.

The operation unit 142 has a control output port 144 electronically connected with the input port 12 of the controlling device 10. When the controlling device 10 receives a control command from the operation unit 142 inputted by the user, the controlling device 10 transmits the control command to the target device 30 for executing a procedure in an operation mode corresponding to the control command. Then, the user can use the controlling device 10 to obtain control right of the target device 30. The operation unit 142 may be a keyboard of a computer, a mouse, a handwriting tablet, a drawing tablet, a touch penal, or a somatosensory device.

The remote connecting device 20 has a controller 21, a transmission interface 22, a communication module 23, and a storage unit 24. The controller 21 is electronically connected with the transmission interface 22, the communication module 23, and the storage unit 24.

The transmission interface 22 is electronically connected with the controlling device 10 for transmitting or receiving data. When the controlling device 10 is electronically connected with the remote connecting device 20, the remote control program in the remote connecting device 20 can be installed in the controlling device 10 and executed by the user. The remote control program provides a plurality of operation modes, and the user can control and manage the data generated by the plurality of operation modes. The controller 21 stores the data in the storage unit 24 for later retrieval. The transmission interface 22 may be a USB interface, a SATA interface, an eSATA interface, a serial port interface, such as RS232, RS422, and RS 485, a SAS interface, a SCSI interface, an IDE interface, a thunderbolt interface, an IEEE 1394 interface, or a micro USB interface.

The communication module 23 wirelessly transmits data back and forth between the remote connecting device 20 and the target device 30 in a bi-directional manner. When the controlling device 10 executes the remote control program, the controller 21 transmits signals to the target device 30 through the communication module 23 to determine whether the remote connecting device 20 is connected with the target device 30. When the remote connecting device 20 is wirelessly connected with the target device 30, the remote connecting device 20 can transmit the control command to the target device 30 through the communication module 23. The remote connecting device 20 can further receive the feedback information transmitted from the target device 30 through the communication module 23. The remote connecting device 20 is directly connected with the target device 30 through the communication module 23 to increase the efficiency of data management. The communication module 23 may support wireless communication protocols, such as WiFi, Bluetooth, ZigBee, wireless USB, infrared rays, UWB, NFC, or RFID.

Figure 3:
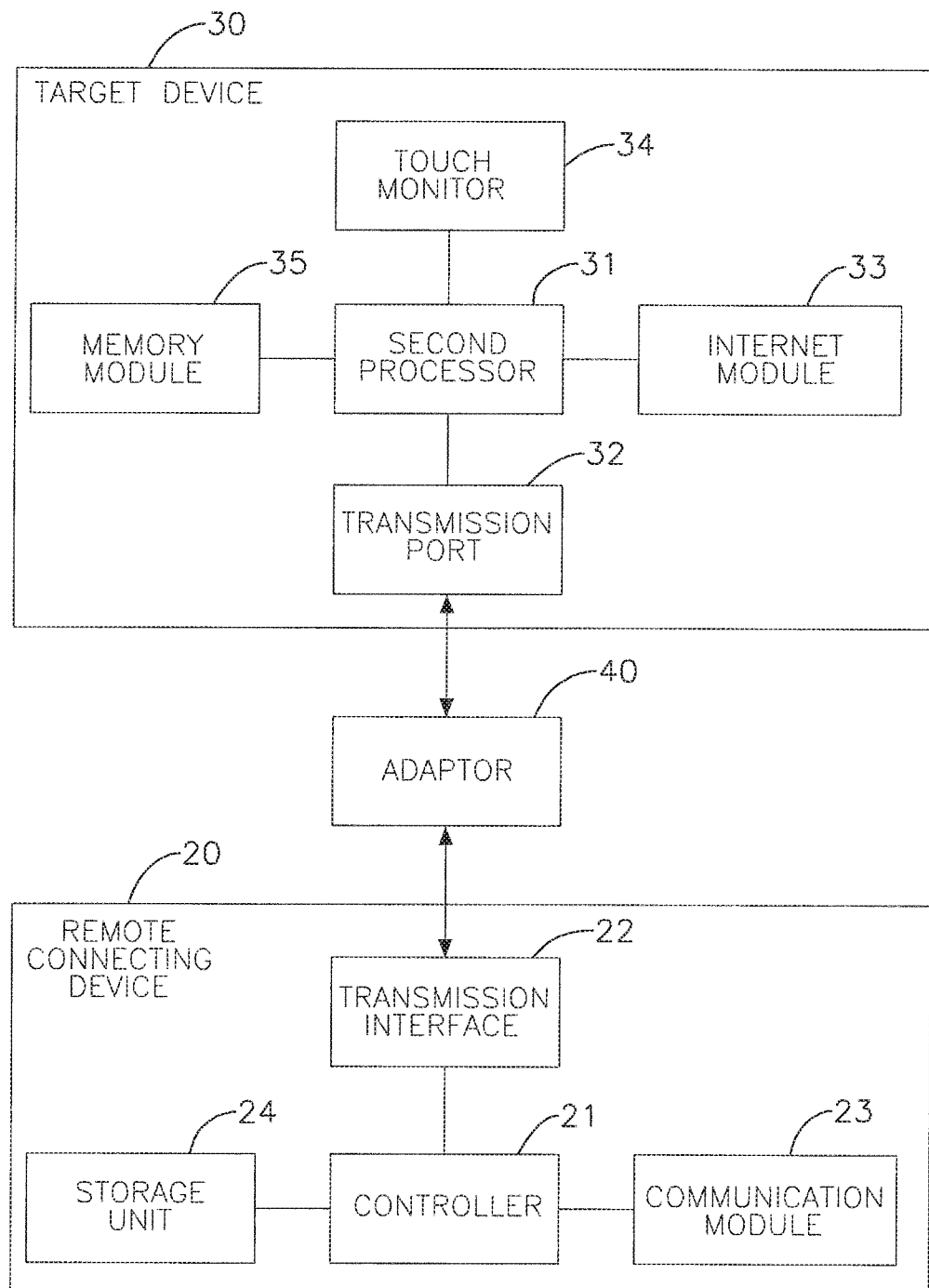
FIG. 3 is a block diagram of a remote connecting device in FIG. 2 and a target device of the system in FIG. 1 connected by means of a wired connection.

With reference to FIG. 3, the transmission interface 22 of the remote connecting device 20 is further connected with the target device 30 in a wired manner through an adaptor 40.

In the embodiment, the target device 30 is a mobile device, and the target device 30 has a second processor 31, a transmission port 32, a network module 33, a touch monitor 34, and a memory module 35. The second processor 31 is electronically connected with the transmission port 32, the network module 33, the touch monitor 34, and the memory module 35. The remote connecting device 20 is electronically connected with the transmission port 32 of the target device 30 through the adaptor 40. Therefore, when transmitting large amounts of data to the remote connecting device 20, the target device 30 can be connected to the remote connecting device 20 through the transmission port 32 and the adaptor 40 according to a wired communication protocol. Then, transmission speed of the data can be increased because of the wired connection. In the embodiment, the adaptor 40 may be a USB adaptor or an eSATA adaptor.

Figure 4:
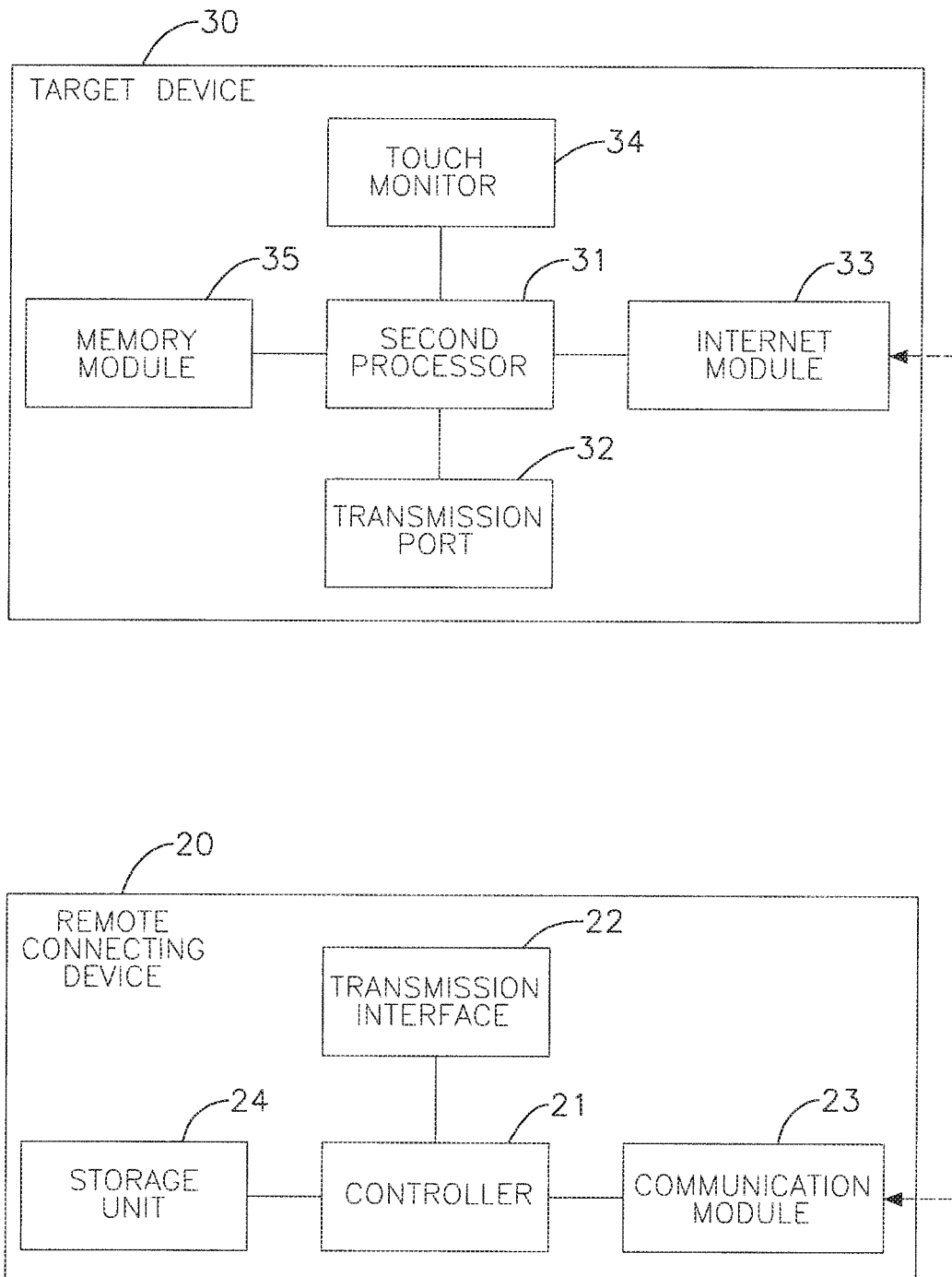
FIG. 4 is a schematic diagram of the remote connecting device and the target device in FIG. 3 connected by means of a wireless connection.

With reference to FIG. 4, the remote connecting device 20 may connect with the target device 30 through the communication module 23 and the network module 33 via a wireless link. Then, the remote connecting device 20 can wirelessly transmit and receive data from the target device 30.

Figure 5:
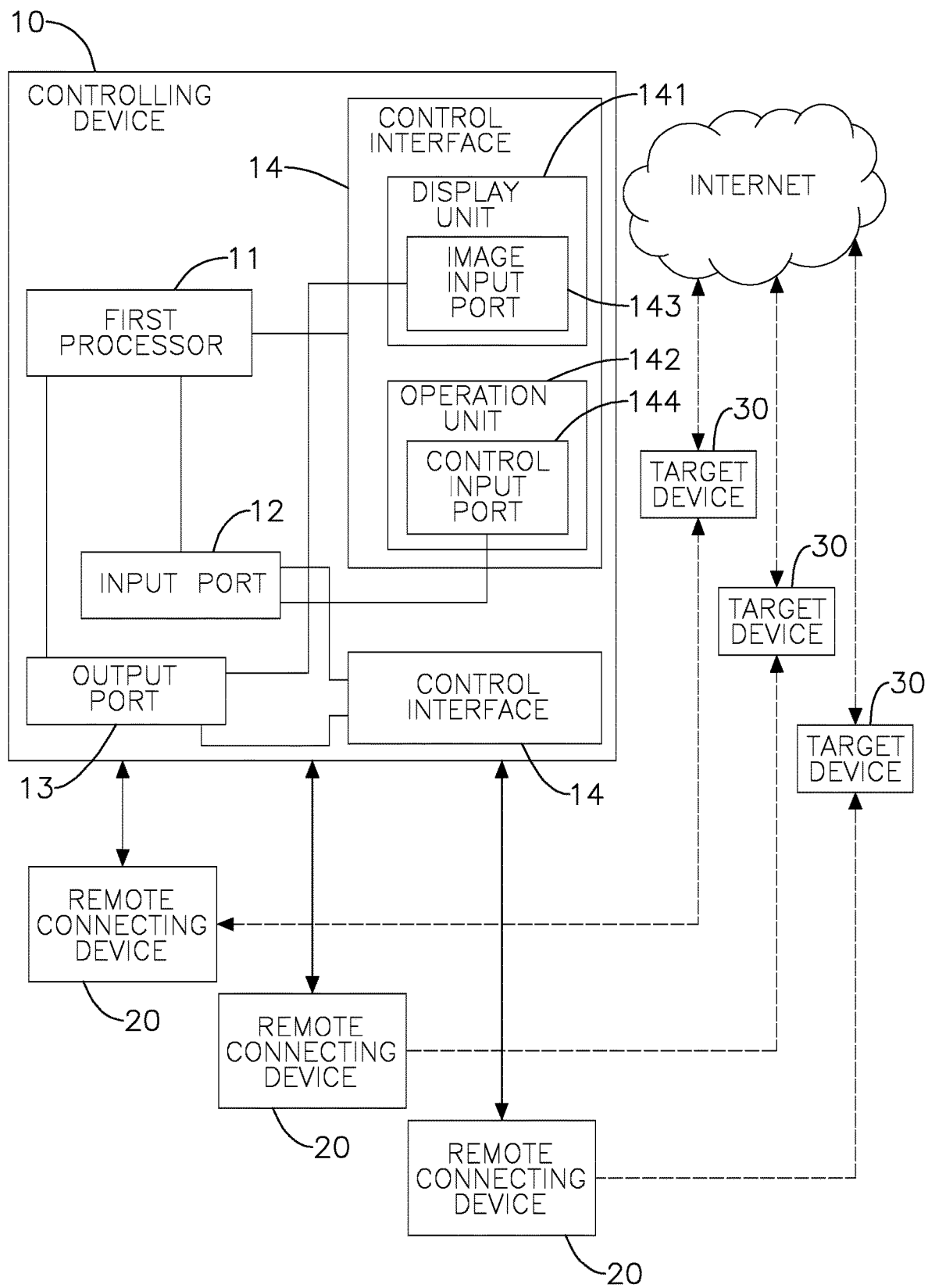
FIG. 5 is a block diagram of a second embodiment of a remotely managing and controlling system in accordance with the present invention.

With reference to FIG. 5, a second embodiment of a remotely managing and controlling system in accordance with the present invention differs from the first embodiment in having multiple remote connecting devices 20 and multiple target devices 30. In the present embodiment, there are three remote connecting devices 20 and three target devices 30. According to the similarities in terms of connection among the controlling device 10, the remote connecting device 20 and the target device 30 in FIGS. 1, 3 and 4, the transmission interface 22 of each remote connecting device 20 is connected to the controlling device 10 and the transmission port 32 of a corresponding target device 30 through the adaptor 40 and the communication module 23 of the remote connecting device 20 is wirelessly connected to the internet module 33 of the corresponding target device 30. Supposing that the controlling device 10 is a personal computer (PC) or a notebook computer and the multiple target devices 30 are a combination of smart phones and tablet PCs, users can monitor and manage activities and information of the target devices 30 and the controlling device 10 through the personal PC or the notebook computer in a centralized fashion. The activities and information include but are not limited to watching browsed information on one smart phone and email on another smart, and doing document processing and watching video on the PC or the notebook computer at the same time.

Figure 6:
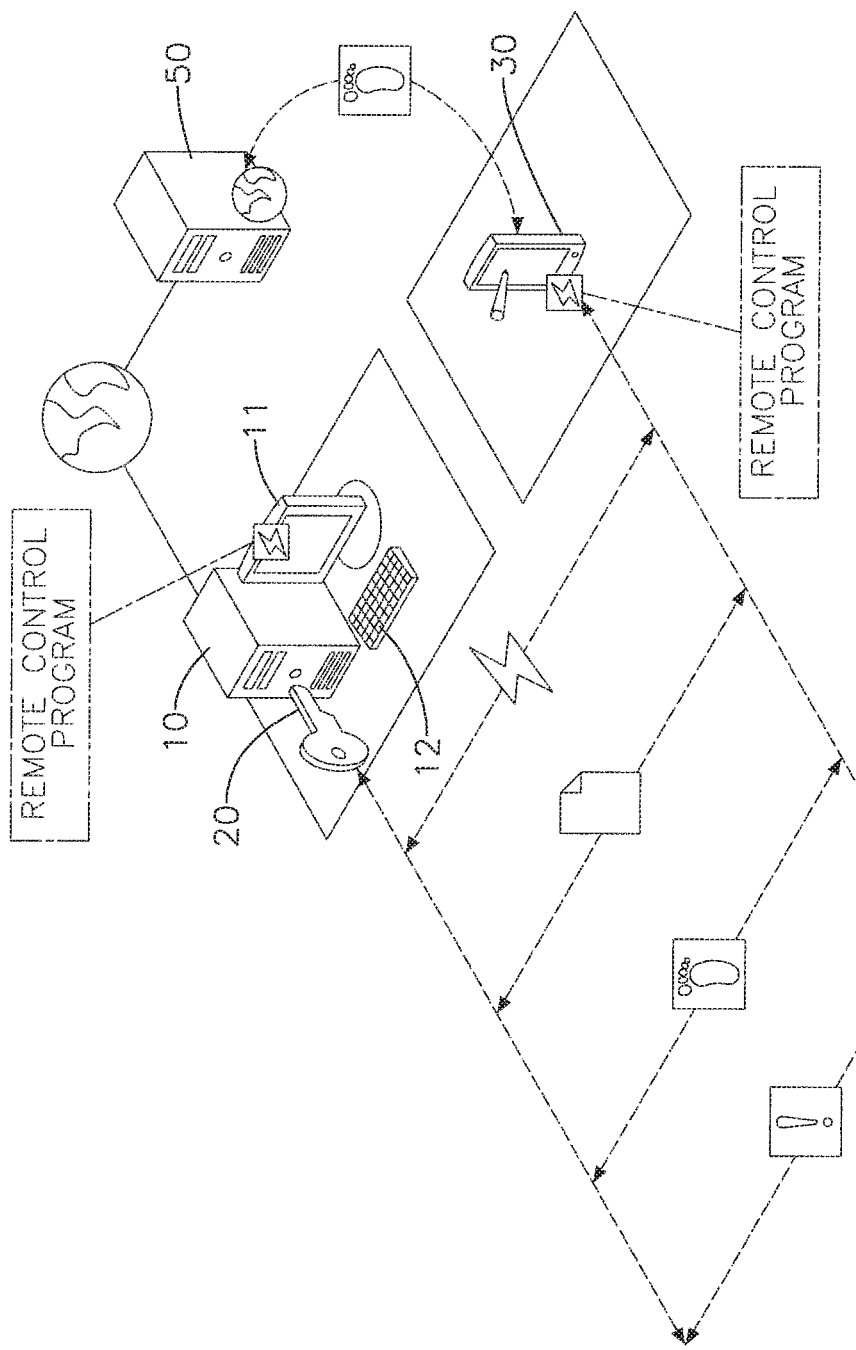
FIG. 6 is a schematic diagram showing an application of the system in FIG. 1.

With reference to FIG. 6, the remote connecting device 20 is connected with the controlling device 10, and stores the remote control program. Then the user can remotely control the target device 30 through the remote connecting device 20. The user uses the operation unit 142 to execute the remote control program in the controlling device 10 through a connection between the remote connecting device 20 and the target device 30. The remote control program is also stored in the target device 30. The target device 30 executes the remote control program for being controlled by the controlling device 10 when the remote connecting device 20 connects to the target device. Therefore, the user can use the operation unit 142 to control the target device 30 to execute each operation mode, and the user can watch an image on the display unit 141. For example, the image is shown on a monitor of the target device 30. Then, the user can control and manage the target device 30 immediately. In the first and the second embodiments of the remotely managing and controlling system, the operation mode includes a program control mode, a data management mode, a remote tracing and control mode, a remote sharing mode, a warning mode, etc. Then, the controlling device 10 can directly manipulate the target device 30 to execute programs stored in the target device 30.

Further, when the remote tracing and control mode is executed, the controlling device 10 and the target device 30 are separately connected to a tracing platform 50 through the Internet. The controlling device 10 can obtain the position of the target device 30, and can transmit the control command to the target device 30 for protecting data stored in the target device 30 and increasing security intensity of data protection. In the first and the second embodiments of the remotely managing and controlling system, the tracing platform 50 is a tracing server.

When the controlling device 10 is connected with the remote connecting device 20, the identity of the user operating the controlling device 10 must be authenticated first. After the identity of the user is correctly authenticated, where the remote control program should be installed to can be further determined by an installation mode or a portable mode selected by the user. The installation mode indicates that the remote control program located in the remote connecting device 20 needs to be installed in the controlling device 10. After the remote control program is installed in the controlling device 10, the controlling device 10 can automatically execute the remote control program to control the target device 30. The remote control program once stored in the controlling device 10 will not be removed even when the controlling device 10 and the remote connecting device 20 are disconnected. Therefore, when the remote connecting device 20 is electronically connected with the controlling device 10 with the remote control program installed therein under the installation mode, the remote control program in the controlling device 10 can be executed automatically.

On the other hand, the portable mode indicates that the remote control program remains intact in the remote connecting device 20 and is not installed in the controlling device 10. When the controlling device 10 is connected with the remote connecting device 20, the controlling device 10 can execute the remote control program stored in the remote connecting device 20 to control the target device 30. When the user wants to remotely operate the target device 30 under the portable mode, the user can electronically connects the remote connecting device 20 with any computer with the identity of the user authenticated and the selection of the portable mode entered through the computer. Then the user can use the computer connected with the remote connecting device 20 to control the target device 30, such as tracing a lost phone, through the remote control program in the remote connecting device 20.

With further reference to FIG. 6, the remote control program is software for executing the managing and controlling method on the system. In the first and second embodiments of the remotely managing and controlling system, the remote control program stored in the target device 30 and the remote control program stored in the controlling device 10 are contacts for the target device 30 and the controlling device 10 communicating with each other. The remote connecting device 20 is a communication liaison between the target device 30 and the controlling device 10.

As mentioned earlier, the identity of the user operating the controlling device 10 is authenticated prior to the choice about how to install the remote control program. The ways of authentication include but are not limited to a combination of hardware authentication, biometric authentication and password authentication. For example, hardware authentication only, one of biometric authentication and password authentication, or hardware authentication and biometric authentication or password authentication for two-factor authentication may be selected for identity authentication of the user operating the controlling device 10. The hardware authentication may be key-based authentication.

Figure 7:
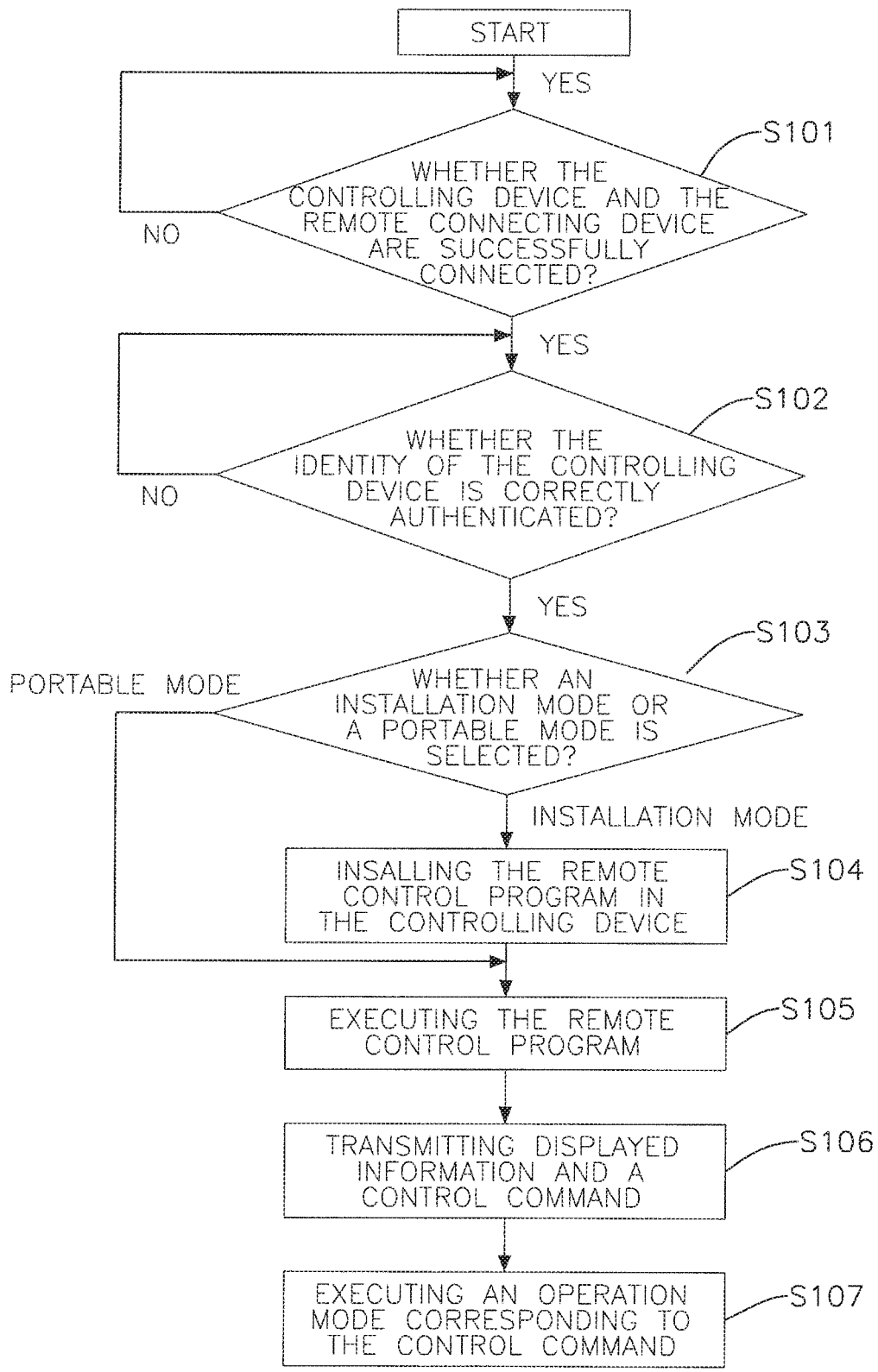
FIG. 7 is a flow chart of an embodiment of a remotely managing and controlling method in accordance with the present invention.
Figure 8:
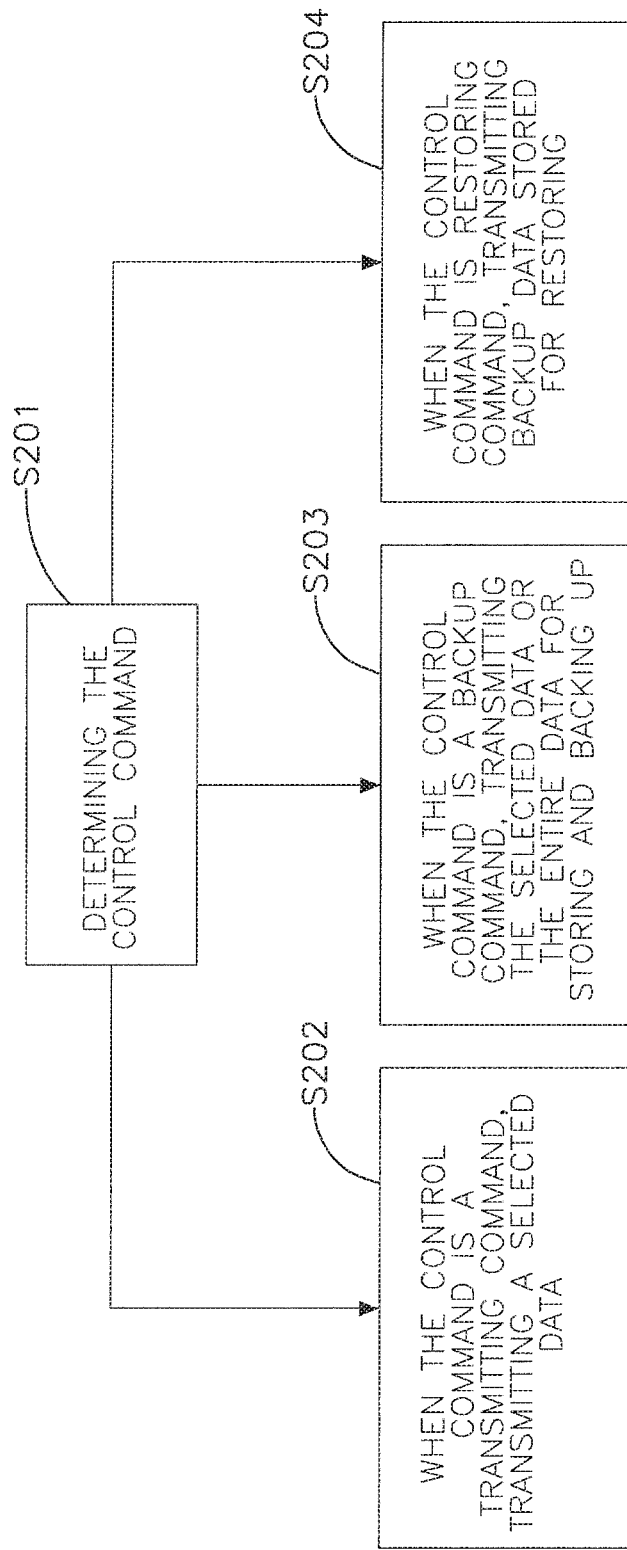
FIG. 8 is a flow chart of managing data.

With reference to FIG. 7, the managing and controlling method is executed by the remotely managing and controlling system when the controlling device 10 is electronically connected to the remote connecting device 20 having the remote control program stored therein, and the managing and controlling method includes the following steps:

determining whether the controlling device 10 and the remote connecting device 20 are successfully connected (S101); when the controlling device 10 and the remote connecting device 20 are successfully connected, performing step S102; otherwise, resuming step S101;

determining whether the identity of the controlling device 10 is correctly authenticated (S102); when the identity of the controlling device 10 is correctly authenticated, performing step S103; otherwise, resuming step S102;

determining whether an installation mode or a portable mode is selected (S103); when the installation mode is selected, performing step S104; when the portable mode is selected, performing step S105; when the installation mode or the portable mode is not selected, performing step S103;

installing the remote control program in the controlling device 10 (S104);

executing the remote control program (S105);

transmitting displayed information from the target device 30 to the display unit 141 of the controlling device 10 for displaying, and transmitting a control command from the controlling device 10 to the target device 30 to control the target device 30 (S106); and performing an operation mode by the target device 30 according to the control command, and transmitting data generated from the operation mode back and forth between the controlling device 10 and the target device 30 (S107);

The controlling device 10 sends a control command to the target device 30 through the remote connecting device 20. Then, data generated as a result of the operation mode corresponding to the control command at the target device 30 can be controlled and managed. Further, the data generated at the target device 30 can be transmitted to the controlling device 10 through the remote connecting device 20 to be backed up or restored after being stored. With reference to FIG. 8, when the user executes the data management mode, the controlling device 10 further executes the following steps after the step S105:

determining the control command (S201);

when the control command is a transmitting command, transmitting the selected data stored in the controlling device 10 to the remote connecting device 20 or the target device 30 (S202);

when the control command is a backup command, transmitting the selected data or the entire data from the target device 30 to the controlling device 10 or the remote connecting device 20 (S203); and when the control command is a restoring command, transmitting data previously backed up in the controlling device 10 or the remote connecting device 20 to the target device 30 (S204).

Figure 9A:
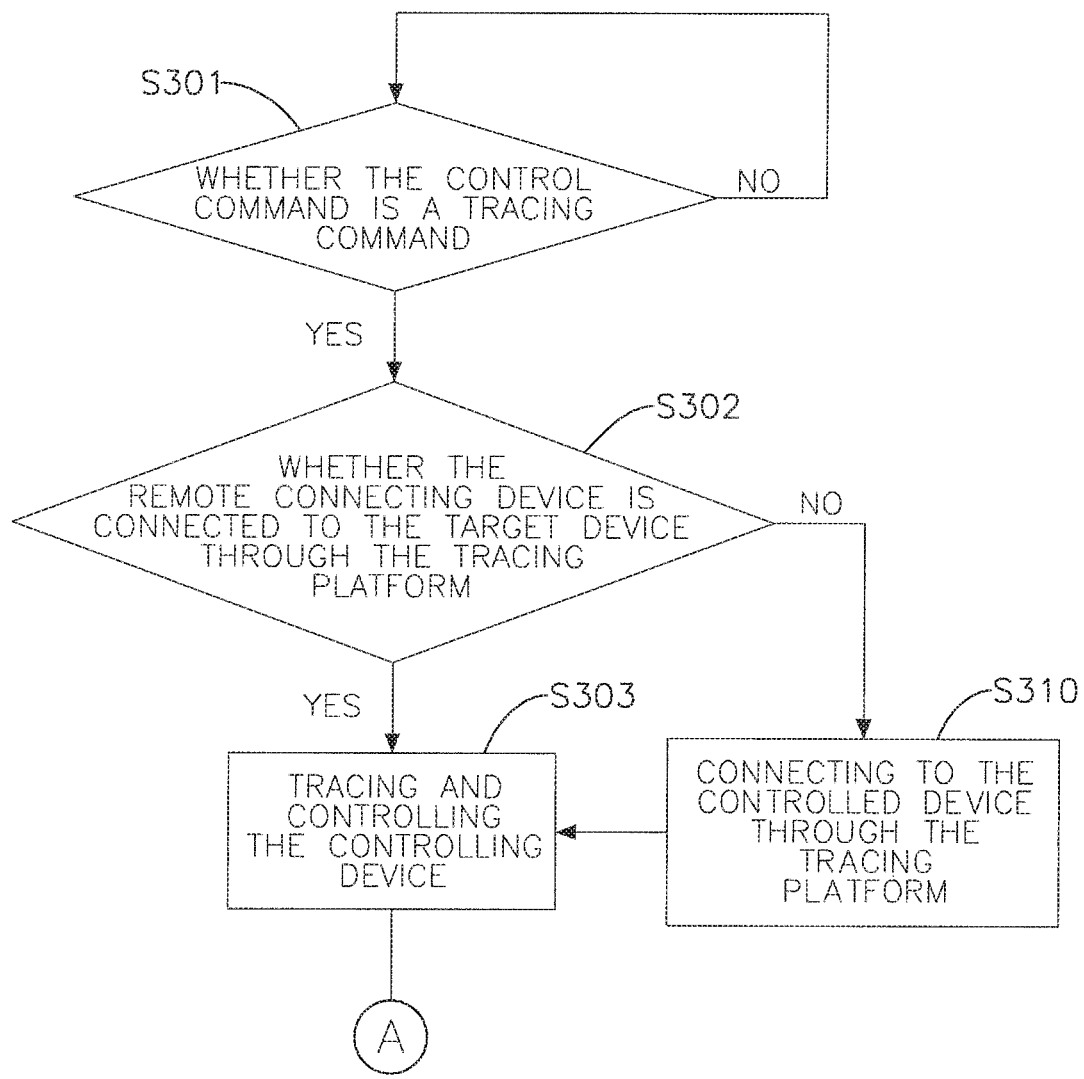

With reference to FIG. 6, FIG. 9A and FIG. 9B, when the user executes the remote tracing and control mode, the controlling device 10 and the target device 30 are connected to the tracing platform 50 through the Internet, and the remote connecting device 20 further executes the following steps after the step S105:

determining whether the control command is a tracing command (S301);

when the control command is the tracing command, determining whether the remote connecting device 20 is connected to the target device 30 through the tracing platform 50 (S302);

when the remote connecting device 20 is connected to the target device 30, executing a remote tracing process, wherein the remote tracing process is executed for tracing and controlling the target device 30 (S303)

wherein a function of the remote tracing process comprises receiving images captured by the target device (S304), receiving position information of the target device 30 (S305), modifying a password of the target device 30, clearing data stored in the target device 30 (S306), outputting a warning by the target device 30 (S307), locking the target device 30 (S308) or recording operation of the target device 30 (S309); in step S309, current activities and events associated with operation on a lost target device 30 or a target device with special task assignment (e.g. official business) can be recorded in the target device 30 and transmitted to a designated remote storage device for storage once the target device 30 is connected to the Internet.

when the remote connecting device 20 is not yet connected to the target device 30, connecting the remote connecting device 20 to the target device 30 through the tracing platform 50 (S310), and then executing the step S303.

Figure 10:
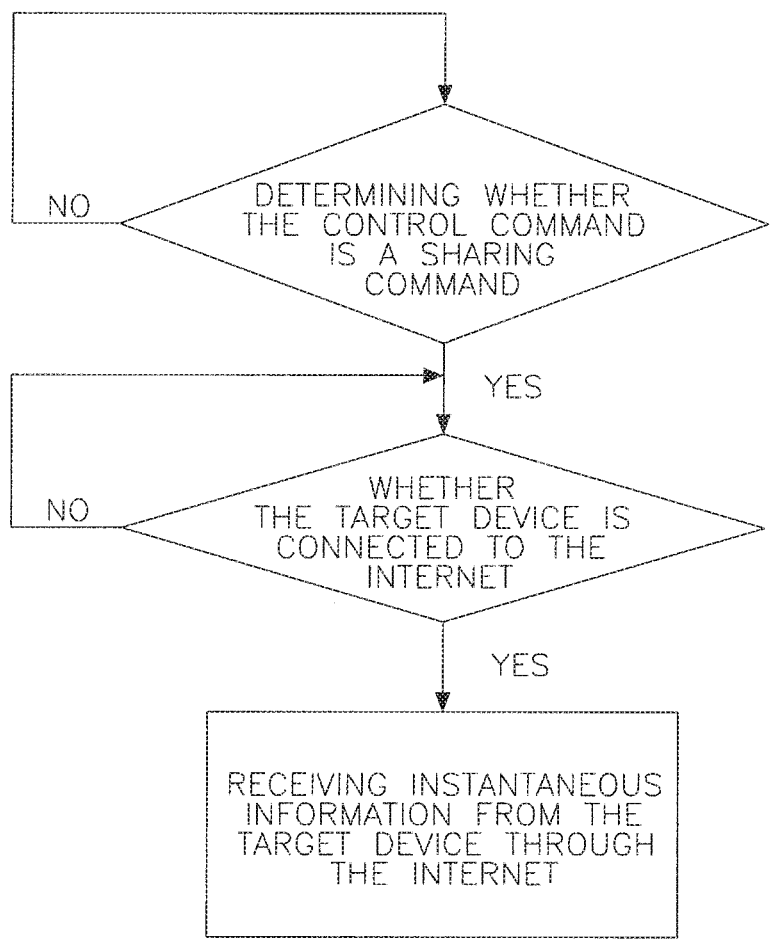
FIG. 10 is a flow chart of sharing data through the Internet.

Because the target device 30 is able to connect to the Internet through the network module 33, the controlling device 10 can indirectly connect to the Internet through the target device 30. With reference to FIG. 10, when the user executes the remote sharing mode, the remote connecting device 20 further executes the following steps after the step S105:

determining whether the control command is a sharing command (S401);

when the control command is the sharing command, determining whether the target device 30 is connected to the Internet (S402);

when the target device 30 is connected to the Internet, receiving instantaneous information from the target device 30 through the Internet (S403).

In the remote sharing mode, the target device 30 is used as a hotspot for connecting to the Internet.

Figure 11:
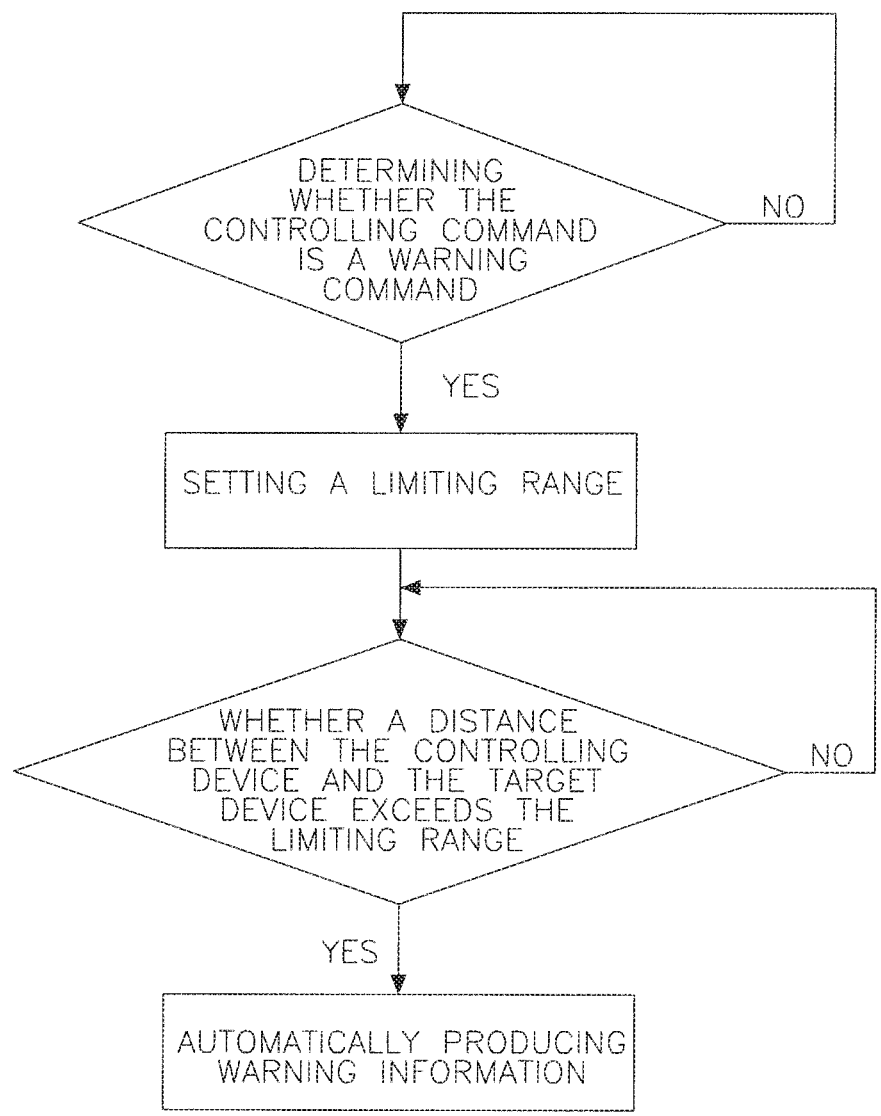
FIG. 11 is a flow chart of producing a warning.

With reference to FIG. 11, when the user executes the warning mode for preventing the target device 30 from being lost or stolen, the target device 30 can produce a control command corresponding to the warning mode and transmit the control command to the remote connecting device 20. Then, the remote connecting device 20 further executes the following steps after the step S105:

determining whether the control command is a warning command (S501);

when the control command is the warning command, setting a limiting range through the controlling device 10 (S502);

determining whether a distance between the controlling device 10 and the target device 30 exceeds the limiting range (S503);

when the distance exceeds the limiting range, automatically producing warning information by both the controlling device 10 and the target device 30 (S504); wherein the warning information is an image or an audio alarm.

The present invention can transmit data, information, or control command between the controlling device 10 and the target device 30 through the remote connecting device 20. The data and the information may be a file, an operation system, application software, a message, a communication record, a contact book, an email, a setting value of a device, etc. The remote control program is installed in the controlling device 10 and the target device 30, and the user can execute the operation mode through the remote control program. Then, the controlling device 10 transmits the control command corresponding to the operation mode to the remote connecting device 20. When the remote connecting device 20 receives a control command and data corresponding to the operation mode from the controlling device 10, the remote connecting device 20 transmits the control command and the data to the target device 30. The remote connecting device 20 further can receive the data output from the target device 30 and transmit the data to the controlling device 10. The present invention can transmit data by the point to point transmission to increase efficiency of transmission speed and management, and further can trace the target device 30 by the tracing platform 50 to increase convenience and security for managing the data.

The present invention provides the remote control program stored in the remote connecting device 20, and the remote control program can be installed either in the controlling device 10 or not. The remote control program is further stored in the target device 30 for connecting the controlling device 10 and the target device 30 through the remote connecting device 20.

The remote control program executed by the controlling device 10 or the remote connecting device can perform the following functions.

1. Remote control of the target device 30: when the remote connecting device 20 is connected with the controlling device 10 by the user, the remote control program can be executed to drive the remote connecting device 20. The display unit 141 of the controlling device 10 displays an image of a monitor of the target device 30, and the user can control the target device 30 by operating the operation unit 142 of the controlling device 10. For example, the user can operate the controlling device 10 to use communication software and an application program of the target device 30, or answer an incoming call of the target device 30.

2. Transmission between the controlling device 10 and the target device 30: when the remote connecting device 20 is connected with the controlling device 10 and driven by the remote control program, the controlling device 10 can transmit data to the target device 30, store the data in the target device 30, and receive data transmitted from the target device 30.

3. Backup and restoration of the data stored in the target device 30: when the remote connecting device 20 is connected with the controlling device 10 and driven by the remote control program, the user can:
   a. back up the data stored in the target device 30 to store the data in the controlling device 10 or the remote connecting device 20; and
   b. restore the target device 30 according to the data backed up in the controlling device 10 or the remote connecting device 20.

4. Tracing a lost target device 30:
   a. Considering that the portable target device 30 may be easily lost, the user can trace the lost target device 30 by the controlling device 10. When the remote connecting device 20 is connected with the controlling device 10 and driven by the remote control program, the user can trace the lost target device 30. The controlling device 10 can use a camera of the target device 30 to capture a suspect using the lost target device 30, and transmits images captured by the camera to the controlling device 10 and the tracing platform 50. The controlling device 10 can receive a position of the target device 30 according to a location unit of the target device 30. The controlling device 10 can modify a password of the target device 30, clear content of the target device 30, control the target device 30 to alarm and vibrate, or record operation activities of the lost target device. The controlling device 10 can further lock the target device 30, and the target device 30 cannot be used until sent back to a supplier of the target device 30 for unlocking the target device 30.
   b. When the controlling device 10 cannot connect to the target device 30 or the remote connecting device 20 cannot be obtained, the controlling device 10 can connect to the tracing platform 50 through the Internet. When information related to the target device 30 is provided to the tracing platform 50, the tracing platform 50 can drive the camera of the target device 30 to capture a suspect using the target device 30, and transmits images captured by the camera to the controlling device 10 and the tracing platform 50. The tracing platform 50 can receive the position of the target device 30 according to the location unit of the target device 30. The tracing platform 50 can modify a password of the target device 30, clear content of the target device 30, control the target device 30 to alarm and vibrate, or record operation activities of the lost target device 30. The tracing platform 50 can further lock the target device 30, and the target device 30 cannot be used until sent back to a supplier of the target device 30 for unlocking the target device 30.

5. Connecting to the Internet through the target device 30: the target device 30 can connect to the Internet through a wireless communication, and when the remote connecting device 20 is connected to the controlling device 10, the controlling device 10 can drive an internet communication unit of the target device 30 to connect to the Internet.

The present invention comprises the following advantages about the remote control program stored in the target device 30.

1. Auto execution: when the target device 30 is started, the remote control program is started automatically.

2. Manipulating the content of the target device 30: when the target device 30 receives operation information output from the controlling device 10 through the remote connecting device 20, the remote control program stored in the target device 30 can display an image displayed by a monitor of the target device 30 on the controlling device 10, and assist the controlling device 10 with controlling the target device 30.

3. Receiving data from the controlling device 10 or transmitting data to the controlling device 10: when the target device 30 receives the data from the controlling device 10, the remote control program stored in the target device 30 can assist the target device 30 with storing the data in the target device 30 or with transmitting data of the target device 30 to the controlling device 10.

4. Assisting the controlling device 10 with backing up and restoring the target device 30: when the target device 30 receives information for backing up and restoring, the remote control program stored in the target device 30 can assist the target device 30 with transmitting backup data to the controlling device 10, or with receiving restoring data from the controlling device 10 for restoring the target device 30.

5. Assisting the target device 30 to be traced: when the target device 30 receives tracing information from the remote connecting device 20 or the tracing platform 50, the remote control program stored in the target device 30 can execute tracing functions according to the tracing information. The tracing functions comprise: using a camera of the target device 30 to capture a suspect using the target device 30, and transmitting images captured by the camera to the controlling device 10 and the tracing platform 50; transmitting a position of the target device 30 to the controlling device 10 or the tracing platform 50 according to a location unit of the target device 30; modifying a password of the target device 30; clearing content of the target device 30; controlling the target device 30 to alarm and vibrate; recording operation activities of the lost target device; locking the target device 30, and the target device 30 cannot be used until sent back to a supplier of the target device 30 for unlocking the target device 30.

6. Assisting the controlling device 10 with connecting to the Internet through the target device 30: when the target device 30 receives connecting information from the remote connecting device 20, the remote control program stored in the target device 30 drives an internet communication unit of the target device 30, and assists the controlling device 10 with connecting to the Internet through the target device 30.

7. Generating alarm when a distance between the controlling device 10 and the target device 30 exceeds a limiting range:

when the remote control program stored in the target device 30 detects the distance between the controlling device 10 and the target device 30 exceeds the limiting range, the control program stored in the target device 30 produces an alarm, and then the user can find a location of the target device 30, and the limiting range can be set up through the remote control program stored in the target device 30 by the user.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is clamed is:

1. A remotely managing and controlling system comprising:
    a controlling device comprising:
        at least one control interface;
        an input port electronically connected with the at least one control interface;
        an output port electronically connected with the at least one control interface; and
        a first processor electronically connected with the at least one control interface, the input port, and the output port, and executing a remote control program;
    at least one remote connecting device, each of the at least one remote connecting device comprising:
        a storage unit;
        a communication module communicating with a target device for transmitting and receiving data;
        a transmission interface electronically connected with the input port and the output port of the controlling device for transmitting data; and
        a controller electronically connected with the transmission interface, the communication module, and the storage unit, and identifying a user identification;
    wherein the remote control program is installed in the at least one remote connecting device and the target device for providing functions of controlling and managing the target device;
    wherein the remote control program of the at least one remote connecting device is installed in the controlling device when the controlling device and the at least one remote connecting device are successfully connected, an identity of the controlling device is correctly authenticated, and an installation mode rather than a portable mode is selected;
    wherein the portable mode indicates that the remote control program remains intact in the at least one remote connecting device and is not installed in the controlling device;
    wherein the installation mode or the portable mode is selected by the user;
    wherein each of the at least one control interface of the controlling device comprises:
        a display unit comprising an image input port electronically connected with the output port of the controlling device for receiving an image signal from the target device and displaying the image signal when the remote control program is executed; and
        an operation unit comprising a control output port electronically connected with the input port of the controlling device for transmitting a control command to the target device for the target device to execute an operation mode corresponding to the control command when the remote control program is executed.

2. The system as claimed in claim 1, wherein:
the controlling device comprises two control interfaces;
the input port and the output port of the controlling device are electronically connected with the control interfaces.

3. The system as claimed in claim 2, wherein the controlling device and the target device are connected to a tracing platform through the Internet, and the controlling device receives data of the target device through the Internet and the tracing platform, and transmits the control command to the target device.

4. The system as claimed in claim 3, wherein the target device is a mobile device.

5. The system as claimed in claim 4, wherein the mobile device comprises:
a transmission port;
a network module;
a touch monitor;
a memory module; and
a second processor electronically connected with the transmission port, the network module, the touch monitor, and the memory module; and
one of the at least one remote connecting device is electronically connected with the network module of the mobile device through the communication module of the at least one remote connecting device.

6. The system as claimed in claim 5, wherein
the controlling device is a personal computer or a notebook computer;
the target device is a smart phone or a tablet;
the display unit is a monitor or a digital display;
the operation unit comprises a keyboard and a mouse;
the transmission interface is a USB interface, a SATA interface, an eSATA interface, a serial port, a SAS interface, a SCSI interface, an IDE interface, a thunderbolt interface, an IEEE 1394 interface, or a micro USB interface; and
the communication module supports communication protocols of WiFi, Bluetooth, ZigBee, wireless USB, infrared rays, UWB, NFC, or RFID.

7. The system as claimed in claim 6, wherein the operation unit further comprises a handwriting tablet and a drawing tablet.

8. The system as claimed in claim 7, wherein operation unit further comprises a touch penal and a somatosensory device.

9. The system as claimed in claim 4, wherein the mobile device comprises:
a transmission port;
a network module;
a touch monitor;
a memory module; and
a second processor electronically connected with the transmission port, the network module, the touch monitor, and the memory module; and
one of the at least one remote connecting device is electronically connected with the transmission port of the mobile device through an adaptor.

10. The system as claimed in claim 9, wherein
the controlling device is a personal computer or a notebook computer;
the target device is a smart phone or a tablet;
the display unit is a monitor or a digital display;
the operation unit comprises a keyboard and a mouse;
the transmission interface is a USB interface, a SATA interface, an eSATA interface, a serial port, a SAS interface, a SCSI interface, an IDE interface, a thunderbolt interface, an IEEE 1394 interface, or a micro USB interface; and
the communication module supports communication protocols of WiFi, Bluetooth, ZigBee, wireless USB, infrared rays, UWB, NFC, or RFID.

11. The system as claimed in claim 10, wherein the operation unit further comprises a handwriting tablet and a drawing tablet.

12. The system as claimed in claim 11, wherein the operation unit further comprises a touch penal and a somatosensory device.

13. The system as claimed in claim 2, wherein the target device is a mobile device.

14. The system as claimed in claim 13, wherein the mobile device comprises:
a transmission port;
a network module;
a touch monitor;
a memory module; and
a second processor electronically connected with the transmission port, the network module, the touch monitor, and the memory module; and
one of the at least one remote connecting device is electronically connected with the network module of the mobile device through the communication module of the at least one remote connecting device.

15. The system as claimed in claim 14, wherein
the controlling device is a personal computer or a notebook computer;
the target device is a smart phone or a tablet;
the display unit is a monitor or a digital display;
the operation unit comprises a keyboard and a mouse;
the transmission interface is a USB interface, a SATA interface, an eSATA interface, a serial port, a SAS interface, a SCSI interface, an IDE interface, a thunderbolt interface, an IEEE 1394 interface, or a micro USB interface; and
the communication module supports communication protocols of WiFi, Bluetooth, ZigBee, wireless USB, infrared rays, UWB, NFC, or RFID.

16. The system as claimed in claim 15, wherein the operation unit further comprises a handwriting tablet and a drawing tablet.

17. The system as claimed in claim 16, wherein the operation unit further comprises a touch penal and a somatosensory device.

18. The system as claimed in claim 13, wherein the mobile device comprises:
a transmission port;
a network module;
a touch monitor;
a memory module; and
a second processor electronically connected with the transmission port, the network module, the touch monitor, and the memory module; and
one of the at least one remote connecting device is electronically connected with the transmission port of the mobile device through an adaptor.

19. The system as claimed in claim 18, wherein
the controlling device is a personal computer or a notebook computer;
the target device is a smart phone or a tablet;
the display unit is a monitor or a digital display;
the operation unit comprises a keyboard and a mouse;

the transmission interface is a USB interface, a SATA interface, an eSATA interface, a serial port, a SAS interface, a SCSI interface, an IDE interface, a thunderbolt interface, an IEEE 1394 interface, or a micro USB interface; and the communication module supports communication protocols of WiFi, Bluetooth, ZigBee, wireless USB, infrared rays, UWB, NFC, or RFID.

20. The system as claimed in claim 19, wherein the operation unit further comprises a handwriting tablet and a drawing tablet.

21. The system as claimed in claim 20, wherein the operation unit further comprises a touch penal and a somatosensory device.

22. The system as claimed in claim 1, wherein the target device is a mobile device.

23. The system as claimed in claim 22, wherein the mobile device comprises:
a transmission port;
a network module;
a touch monitor;
a memory module; and
a second processor electronically connected with the transmission port, the network module, the touch monitor, and the memory module; and
one of the at least one remote connecting device is electronically connected with the network module of the mobile device through the communication module of the at least one remote connecting device.

24. The system as claimed in claim 23, wherein
the controlling device is a personal computer or a notebook computer;
the target device is a smart phone or a tablet;
the display unit is a monitor or a digital display;
the operation unit comprises a keyboard and a mouse;
the transmission interface is a USB interface, a SATA interface, an eSATA interface, a serial port, a SAS interface, a SCSI interface, an IDE interface, a thunderbolt interface, an IEEE 1394 interface, or a micro USB interface; and
the communication module supports communication protocols of WiFi, Bluetooth, ZigBee, wireless USB, infrared rays, UWB, NFC, or RFID.

25. The system as claimed in claim 24, wherein the operation unit further comprises a handwriting tablet and a drawing tablet.

26. The system as claimed in claim 25, wherein the operation unit further comprises a touch penal and a somatosensory device.

27. The system as claimed in claim 22, wherein the mobile device comprises:
a transmission port;
a network module;
a touch monitor;
a memory module; and
a second processor electronically connected with the transmission port, the network module, the touch monitor, and the memory module; and
one of the at least one remote connecting device is electronically connected with the transmission port of the mobile device through an adaptor.

28. The system as claimed in claim 27, wherein
the controlling device is a personal computer or a notebook computer;
the target device is a smart phone or a tablet;
the display unit is a monitor or a digital display;
the operation unit comprises a keyboard and a mouse;
the transmission interface is a USB interface, a SATA interface, an eSATA interface, a serial port, a SAS interface, a SCSI interface, an IDE interface, a thunderbolt interface, an IEEE 1394 interface, or a micro USB interface; and
the communication module supports communication protocols of WiFi, Bluetooth, ZigBee, wireless USB, infrared rays, UWB, NFC, or RFID.

29. The system as claimed in claim 28, wherein the operation unit further comprises a handwriting tablet and a drawing tablet.

30. The system as claimed in claim 29, wherein the operation unit further comprises a touch penal and a somatosensory device.

31. A remotely managing and controlling method performed by a remote managing and controlling system, wherein the system includes a controlling device, at least one remote connecting device, and at least one target device, with the at least one remote connecting device electronically connected to the controlling device and communicatively connected to the respective target device, the method comprising:
determining whether the controlling device and the at least one remote connecting device are successfully connected;
determining whether an identity of the controlling device is correctly authenticated when determining that the controlling device and the at least one remote connecting device are successfully connected;
determining whether an installation mode or a portable mode is selected;
installing a remote control program stored in the at least one remote connecting device in the controlling device when the installation mode is selected;
executing the remote control program;
transmitting displayed data from the target device to the controlling device, and transmitting a control command from the controlling device to the target device; and
executing an operation mode by the target device according to the control command.

32. The method as claimed in claim 31, wherein the step of executing the operation mode by the target device comprises:
identifying the control command by the controlling device, wherein
when the control command is a transmitting command, transmitting selected data stored in the controlling device to the at least one remote connecting device or the target device;
when the control command is a backup command, transmitting selected data to be backed up from the target device to the controlling device or the at least one remote connecting device;
when the control command is a restoring command, transmitting data previously backed up in the controlling device or the at least one remote connecting device to the target device.

33. The method as claimed in claim 32, wherein the step of executing the operation mode by the target device comprises:
determining whether the control command is a tracing command;
determining whether the at least one remote connecting device is connected to the target device successfully when the control command is the tracing command;
executing a remote tracing process when the at least one remote connecting device is connected to the target device successfully, wherein the remote tracing process is executed for tracing and controlling the target device and comprises receiving images captured by the target device, receiving position information of the target device, modifying a password of the target device, and clearing data stored in the target device, outputting a warning by the target device, recording operation activities and events of the target device, and locking the target device; and connecting the at least one remote connecting device to the target device through a tracing platform when the at least one remote connecting device is not yet connected to the target device successfully, and then executing the remote tracing process.

34. The method as claimed in claim 33, wherein the step of executing the operation mode by the target device comprises:

determining whether the control command is a sharing command;

determining whether the target device is connected to the Internet when the control command is the sharing command;

receiving instantaneous information from the target device through the Internet when the target device is connected to the Internet.

35. The method as claimed in claim 34, wherein the step of executing the operation mode by the target device comprises:

determining whether the control command is a warning command;

setting a limiting range when the control command is the warning command;

determining whether a distance between the controlling device and the target device exceeds the limiting range; and automatically producing warning information when the distance exceeds the limiting range.

36. The method as claimed in claim 35, wherein authentication of the identity of the controlling device comprises a combination of hardware authentication, biometric authentication and password authentication.

37. The method as claimed in claim 32, wherein authentication of the identity of the controlling device comprises a combination of hardware authentication, biometric authentication and password authentication.

38. The method as claimed in claim 33, wherein authentication of the identity of the controlling device comprises a combination of hardware authentication, biometric authentication and password authentication.

39. The method as claimed in claim 34, wherein authentication of the identity of the controlling device comprises a combination of hardware authentication, biometric authentication and password authentication.

40. The method as claimed in claim 31, wherein authentication of the identity of the controlling device comprises a combination of hardware authentication, biometric authentication and password authentication.

* * * * *